Figure 2:
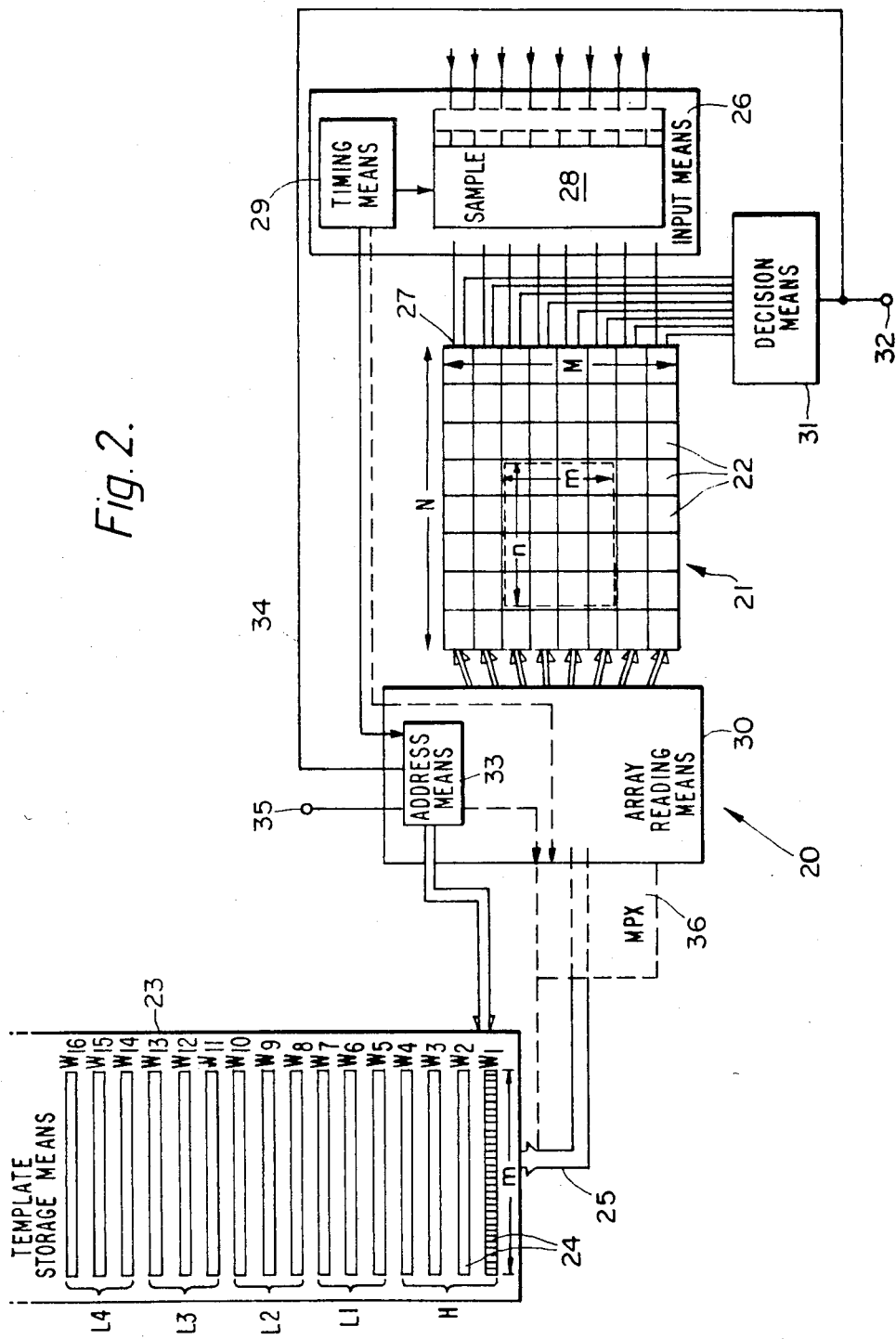

United States Patent [19]

Lloyd et al.

[11] Patent Number: 4,797,941
[45] Date of Patent: Jan. 10, 1989

[54] PATTERN DETECTION IN TWO DIMENSIONAL SIGNALS

[76] Inventors: Peter G. Lloyd, 3 Apple Hill Road, Bale d'Urfé, Quebec, Canada, H0X 3G5; David A. Dadley, 7, Holmesdale Road, Sevenoaks, TN13 3XL, England

[21] Appl. No.: 880,995
[22] Filed: Jul. 1, 1986
[30] Foreign Application Priority Data Jul. 2, 1985 [GB] United Kingdom ............... 8516867

[51] Int. Cl.$^4$ .............................................. G06K 9/64
[52] U.S. Cl. ......................................... 382/27; 382/34
[58] Field of Search ......................... 382/27, 34, 30, 8

[56] References Cited

U.S. PATENT DOCUMENTS

| | | | |
|---|---|---|---|
| 3,898,617 | 8/1975 | Kashioka et al. | 382/8 |
| 4,027,284 | 5/1977 | Hoshino et al. | 382/30 |
| 4,119,946 | 10/1978 | Taylor | 382/34 |
| 4,153,897 | 5/1979 | Yasuda et al. | 382/30 |
| 4,435,835 | 3/1984 | Sakow et al. | 382/8 |

Primary Examiner—Leo H. Boudreau
Attorney, Agent, or Firm—Kerkam, Stowell, Kondracki & Clarke

[57] ABSTRACT

Detection of a pattern feature in a two dimensional signal e.g. as produced by scanning a linear array of detectors, is performed by apparatus 20 (FIG. 3) comprising an M×N array 21 of serial input shift registers 40 in which the signal, digitized to binary level samples and on M channels, is stored. Sampling and input occur at timing intervals controlled by timing means 29, previous samples being shifted one stage through the registers. Pattern features each comprising a binary level pattern formed on an M×N element map of the array and comprising only one element per row, are encoded as sets of M binary address words defining shift register addresses in M.log$_2$N-bit template words stored in ROM 23'. A ROM address register 33' points to a ROM location and extracts a template word on bus 25 which comprises M.log$_2$N lines so that all the address words are extracted in parallel. A 1-out of-N data selector connected to parallel outputs of each shift register is addressed by its own log$_2$N lines of bus 25 and in accordance with the value of the address word outputs the state of the appropriate shift register stage. The selectors produce outputs simultaneously to an M-input AND gate 55. If all inputs are '1' then the pattern feature defined by the signal distribution in the registers corresponds to the template word and detection of the pattern is signalled. In each timing interval a succession of clock pulses from timing means 29 indexes address register 33' to extract a succession of template words until detection is achieved. If detection is not achieved the template words are again extracted in the next timing interval with a new signal distribution in the registers.

14 Claims, 4 Drawing Sheets

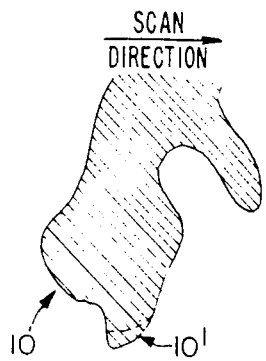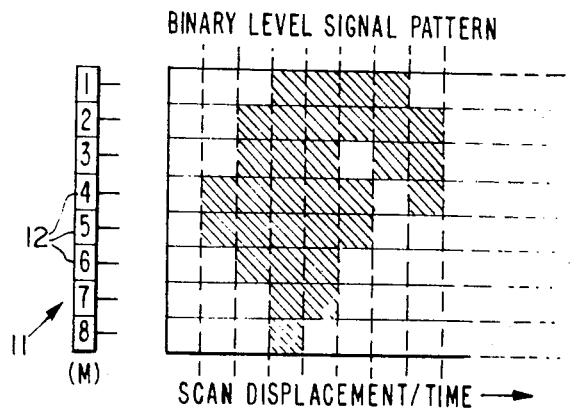
Fig. 1(a)
Fig. 1(b)
Fig. 1(c) BIT MAP OF PATTERN ON ARRAY
Fig. 1(d) PATTERN FEATURE MAP
Fig. 1(e) TEMPLATE WORD
Fig. 1(f) ARRAY CELL NO. / SIGNAL SHIFT DIRECTION
Fig. 1(g) PATTERN FEATURE MAP WITH EMPTY ROW FLAG
Fig. 1(h) TEMPLATE WORD

PATTERN DETECTION IN TWO DIMENSIONAL SIGNALS

This invention relates to the general field of pattern recognition and in particular to the detection of the presence of a pattern feature in a two-dimensional electrical signal.

The term "two-dimensional electrical signal" is used to mean a signal which varies a characteristic thereof, such as amplitude, as a function of two parameters. Examples of such parameters include time, distance, and frequency. One form of two-dimensional signal often met in pattern recognition is produced by a plurality of parallel signal channels each carrying a one-dimensional signal, an example being that provided by a one-dimensional array of radiation detectors scanned transversely to the array length over a pattern, each detector defining a signal channel on which the signal varies in amplitude as a function of time or displacement of the array.

One form of pattern recognition is known by the term template matching and various methods have been proposed to implement it. Basically, the two dimensional signal is generated as, or digitised to, a binary level signal which is bit-mapped into a corresponding two-dimensional array of binary-state storage cells. A template of the pattern is stored in a separate reference array by appropriately defining the logic states of cells thereof. Then a bit-by-bit comparison is made between the logic state of corresponding cells of the reference and signal arrays to determine the degree of correspondence, or correlation between them.

It will be realised that all such template matching arrangements rely upon the pattern content of the signal conforming to the configuration of the template in all respects, that is, dimensions, orientation etc. and furthermore if the signal containing the pattern is derived from a physical source, for example, by radiation emitted from, or detected by, a freely moving object then there must exist a large number of possible configurations of the pattern from the same source.

Thus even a simple pattern may potentially require a large number of templates to cover every possible pattern configuration in the signal or alternatively, the signal must be operated on to conform to a 'standard' form, or other decision procedures introduced to extract identifying information from the signal and limit the number of possibilities.

Hitherto the cost of storing large numbers of templates has been a drawback and development has tended towards improving correlation between a signal pattern and a fewer number of templates by increased processing of the signals. However such processing involves complex, and not necessarily inexpensive, circuitry and what may be equally important, may greatly increase the time necessary to effect a detection of a template pattern.

Such additional processing frequently involves correlation by comparing the template pattern with all, or portions of, the signal delayed, or otherwise effectively displaced, with respect to the store map such that for each displacement a correlation value, representing a measure of the degree of identity with the template, is found and searching for a correlation value greater than a threshold to indicate that the signal does contain a representation of the template pattern.

Such manipulation of the pattern formed by the input signal follows precise mathematical steps which are fixed for any arrangement and takes no account of whether or not the pattern configurations derived thereby can have any relationship to the template pattern.

Such procedures are often employed in respect of the recognition of a small special group of possible patterns, alphanumeric characters, and in addition to such correlation techniques the signals representing such characters are often subjected to processing operations, called pre-processing, in which the signals are manipulated to 'normalise' the character dimensions and the character line thickness these signals represent to increase the probability of an early match with a template pattern.

With irregular or difficult to define patterns, for example, tissue cells or three dimensional objects, in which the relationships between patterns cannot be readily defined then other processing techniques based upon area, statistical analysis and the like have to be used, effectively prohibiting a 'real-time' analysis.

In all pattern recognition systems described in the art the emphasis is upon accuracy, or certainty of recognition and as well as inherently complex processing procedures employed to minimise the storage of templates the processing includes a redundancy or duplication of input signal which further slows the recognition operation and increases cost.

In laboratory and office conditions where such pattern-representing signals are derived from human activity then the times of processing procedures may not appear long in relation to the speed of the human activity but there are applications where the input signals are produced and have to be processed at such a rate that many of the sophisticated correlation techniques are too slow to monitor the signal completely and/or the processing circuitry required results in a system which is too complex or costly.

With the increasing availability of inexpensive and fast-access memory devices in which to store template pattern data it is now practicable to reverse the trend of circuit and operational complexity. However it is not simply a matter of storing a large number of two-dimensional pattern templates representing sight pattern configurations as the conventional comparison and correlation techniques still limit the rate at which signals can be processed without recourse to other of the outlined additional processes.

It is an object of the present invention to provide a method of detecting the presence of a pattern feature in a two-dimensional electrical signal, and an arrangement for such detection, which is operable at high rates of input signal while simpler and more cost effective than known arrangements.

According to a first aspect of the present invention apparatus for detecting the presence of a pattern feature in a two-dimensional electrical signal comprises a two-dimensional array of signal $M \times N$ storage cells, template storage means operable to contain one or more template words, each word defining a set of storage m ($\leq M$) cell addresses, individual addresses of the set being associated with individual adjacent values of one coordinate direction of the array and representing one of n ($\leq N$) address values in the other coordinate direction of the array coincident with a template, defining the pattern feature, mapped onto the array, input means arranged to apply the signal in discrete samples to the storage cells, array reading means operable to extract a template word from the template storage means, address storage cells of the set defined by the template word and read the levels of sample signals in the addressed cells and decision means operable to determine the proportion of addressed cells containing signal sample levels characteristic of a pattern feature and responsive to a proportion in excess of a predetermined minimum to provide a detection signal indicative of detection of the presence of a template pattern feature in the electrical signal.

According to a second aspect of the present invention a method of detecting a pattern feature in a two-dimensional electrical signal applied to a two-dimensional array of storage cells comprises, in a preliminary step, storing at least one template word, each template word being a set of storage cell address words, individual ones of which are associated with individual values of one coordinate direction of the array and represent address values, in the other coordinate direction, of cell locations coincident with a template, defining the pattern feature, mapped onto the array, and operationally applying a two-dimensional signal to said array of storage cells, extracting a template word from the template storage means, addressing a set of cells, one at each value of said one coordinate direction, at address values of said other coordinate direction defined by the template word, reading the signal levels of the addressed cells, determining whether substantially all of the levels of the addressed cells are characteristic of the levels of a pattern feature template, and in response to a successful determination providing an indication that the pattern feature has been detected in the signal.

Figure 3:
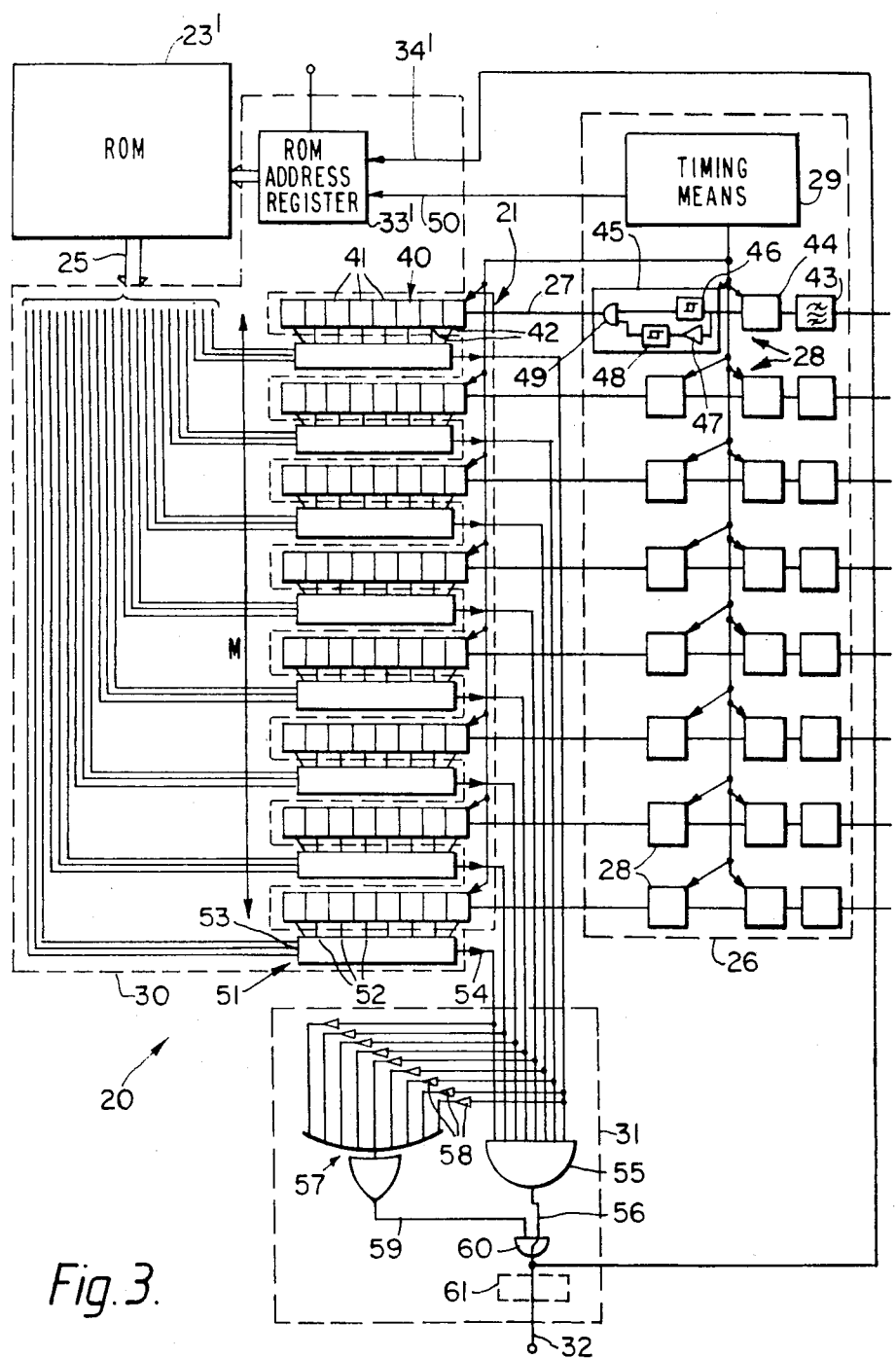
Figure 4A:
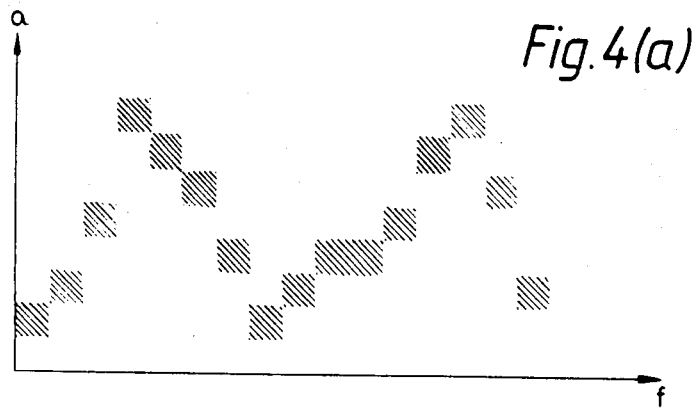
Figure 4B:
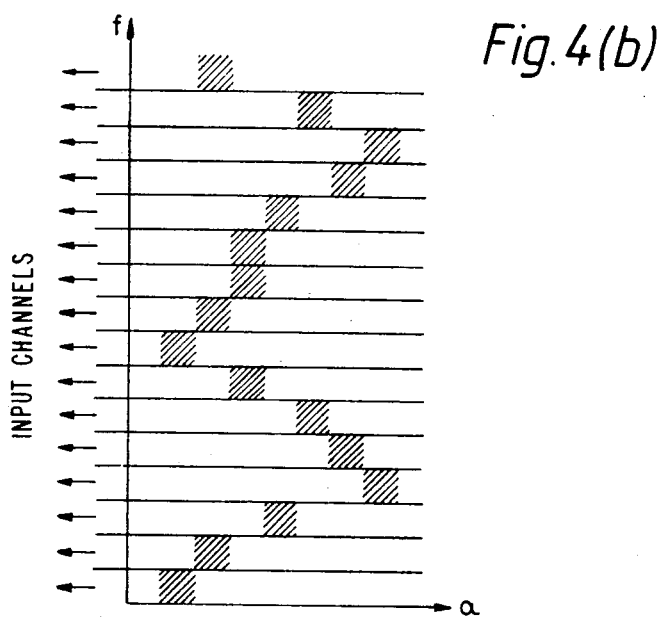
Figure 4C:
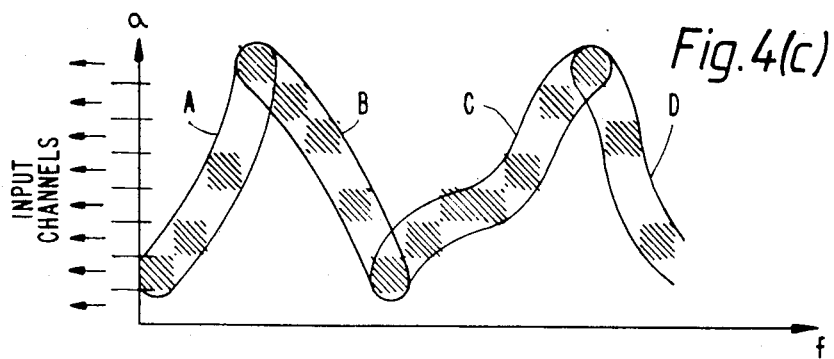

Embodiments of the invention will now be described by way of example with reference to the accompanying drawings, in which:

FIG. 1(a) shows an explanatory optical scanning system for forming a two-dimensional electrical signal, in the form of a plurality of parallel signal channels, FIG. 1(b) shows a graphical representation of the signal levels of a two dimensional signal formed by the scanning system of FIG. 1(a) as a pattern formed by a rectangular grid array, each row of the array being associated with an individual signal channel, FIG. 1(c) is a bit-map corresponding to the array of FIG. 1(b) in which the signals are defined in terms of binary digits '0' and '1', representing binary states, FIG. 1(d) is a bit map showing a pattern feature, derived from the pattern of FIG. 1(c), and taking the form, according to the present invention, of only one bit per row of the array (corresponding to individual signal channels), FIG. 1(e) shows a table illustrating for each signal channel/array row the location of each '1' as a binary word, FIG. 1(f) shows a cell array pattern shifted in respect to that illustrated in FIG. 1(c), FIG. 1(g) is a bit map showing a pattern feature derived from the pattern of FIG. 1(f), FIG. 1(h) is a table illustrating for each signal channel/array row location of each 'one' as a binary word, FIG. 2 is a schematic block diagram of a generalised form of apparatus according to the present invention, FIG. 3 is a circuit diagram of a particular construction of the apparatus of FIG. 2, FIG. 4(a) is a graphical illustration of a two dimensional signal in the frequency domain as produced by a spectrum analyser, FIG. 4(b) is the signal of FIG. 4(a) drawn with the axes interchanged to illustrate its correlation with the signal channels of the apparatus of the present invention, and FIG. 4(c) is the signal of FIG. 4(a) illustrating its correlation with the signal channels of apparatus of the present invention and having a succession of pattern features thereof superimposed on the signal representations.

Referring to FIG. 1, an object 10, seen in plan view, contrasts with its background and constitutes by its outline a pattern. The pattern is scanned by a linear array 11 of optical detectors 12. The term 'optical' is used in its most general sense and depending upon the form of transducers used, may extend into the far infra-red portion of the spectrum.

Each transducer represents a separate signal channel and provides an analogue signal during the scan which varies in level in accordance with variations in the intensity of radiation received during the scan. The analogue signal on each channel is 'pre-processed' by sampling its level at regular intervals and the sample level compared with a threshold to produce a binary state signal in which a binary significant level of signal indicates the presence of an element of the pattern.

FIG. 1(b) shows binary levels associated with a set of such signals disposed to form a two-dimensional rectangular array or signal pattern, each signal channel defining a discrete value in one coordinate direction (ordinate) of the array and extending in the other coordinate direction (abscissa) in a series of discrete values defined by the sampling intervals, the locations of binary significant values of the signals being shown hatched.

The scanning array 11 may thus be considered as providing a two dimensional binary level signal which corresponds to a somewhat crude, or low-resolution, representation of the pattern.

In this specification wherein binary levels are represented by the symbols '1' and '0' a binary significant level is considered to be a '1' and it is convenient to show the array of pattern elements of FIG. 1(b) as a bit-map array of corresponding '1"s and '0"s in FIG. 1(c) which will help in describing the present invention.

Considering further the two-dimensional signal produced by physically scanning a linear array 11 across an object as in FIG. 1(a), the configuration of the pattern in the signal, representative of the whole object pattern or some part of it, is not only a function of the object shape but also depends upon the part of the object 'observed' by the scanner, the distance between the object and scanner, the starting point of the scan, the orientation of the scanner array with respect to the object, the direction of scan and the speed of scan. A change in any one of these parameters will result in a different pattern characterising the two dimensional signal so that, considering the possible combinations of parameter changes, even a simple pattern feature may result in a large number of possible patterns, and the pattern represented by the bit-map array of FIG. 1(c) is the result of just one such scan.

The present invention simplifies the situation somewhat in defining a feature of each possible pattern by one element per row of the array. For example, the left hand edge of the object may be defined as a pattern feature and derived from the exemplary pattern in the array of FIG. 1(c) by the bit array of FIG. 1(d).

This pattern feature when derived from a scan with different parameters will result in a different disposition of bits in the equivalent array to FIG. 1(d), that is, the positions of the '1"s may be shifted along the array and/or rotated and/or represent a different scale.

To accommodate this, all possible such pattern feature variations are determined which, between them, will include the left hand edge pattern feature irrespective of the set of parameters prevailing for a particular scan.

Referring now to FIG. 2, this shows apparatus according to the present invention schematically, by way of functional blocks, which will serve to describe in general terms the method of operation.

The apparatus 20 comprises a two dimensional array 21 of signal storage cells 22 organised into M rows of N cells per row and into each cell 22 of which a representation of the level of a discrete electrical signal can be input.

The apparatus also includes template storage means 23 which in operation is caused to contain a plurality of template words. The storage means will typically contain thousands of such words although for the purposes of illustration sixteen such template words are shown at 24, and designated $W_1$-$W_{16}$. Each template word 24 in fact comprises a set of m address words, each defining a storage cell address and initially it will be assumed that m=M, that is there is one address word for each row of the storage cell array. Individual addresses defined by the address words of the set are associated with individual adjacent values of one co-ordinate direction of the array, that is, rows of the array, and each represents a single address value in the other co-ordinate direction, that is, cells in associated rows. The addresses represent the storage cell locations defined by the bit map of FIG. 1(d) when superimposed on the array and are encoded in the template storage means in any convenient form, for example as the binary coded as $\log_2$ N-bit words drining cell addresses 0 to (N−1) corresponding to cell numbers 1 to N. For the pattern feature map shown in FIG. 1(d), (an 8-column array), the cell addresses are encoded as 3-bit words shown in the table of FIG. 1(e).

The template storage means has an output bus 25 on which the individual address words making up each template word appear in parallel.

The apparatus includes input means 26 which is arranged to apply an input signal in discrete samples on lines 27 to the storage cells 22. Depending upon the nature of the input signal the input means may include pre-processing means to separate the signal into M parallel channels corresponding to rows of the array if it is not already in separate channels. The signal levels on the individual channels are sampled by sampling means 28 at timing intervals defined by timing means 29 and the sample signals for individual channels applied to the storage cells associated with the channels.

The sample signal levels are conveniently referred to a predetermined threshold level and as a result thereof take a binary form representing the binary states '1' and '0' which is manifested in standard logic levels, for application to the storage cells. Each sample signal having a signal level greater than the threshold level constitutes setting a storage cell to a binary '1' state whereas a sample signal level less than the threshold causes the storage cell to be set to a '0'.

In addition to controlling the taking of signal samples the timing means also controls the application of the signal samples to the cells of the array, that is, the setting of the binary states of those cells, such that the pattern of stored signal samples is altered as each new sample is added.

The apparatus 10 also comprises array reading means, shown generally at 30, which is operable under the control of the timing means 29 to extract a template word from the template storage means 23 (by way of bus 25) and in accordance therewith address one storage cell per row of the array and read the levels of sample signals in the addressed cells.

The apparatus also comprises decision means 31 which responds to the levels of the signals read from the addressed cells, that is, their binary states, and determines the proportion of such addressed cells containing signal sample levels characteristic of a pattern feature, i.e. '1's, providing a detection signal at 32 indicative of detection of the presence of a pattern feature defined by a template word in the electrical signal.

The array reading means also includes address means 33 for the template storage means coupled to the timing means 29 to receive therefrom in each timing interval a succession of clock pulses. The address means 33 serves to locate a template word in the storage means and extract it by way of bus 25 in response to each clock pulse. The template words are held at a plurality of locations within the storage means and the address means may merely index through the locations in response to the clock pulses or may be directed to a particular location by means of a detection signal from the decision means on line 34.

The address means 33 may have an output 35 and in response to a detection signal from the decision means give an indication of the identity of the template word currently extracted and producing said detection signal.

Considering operation of the apparatus, it is assumed that the template storage means has been previously loaded with a plurality of template words, each defining a possible pattern feature of the type shown in FIG. 1(d), and that a number of samples of the signal have been input to the storage cells to set the binary states thereof, giving a cell state occupancy for the array of the type shown in FIG. 1(c). It is also assumed that the input means, in applying samples signals to the storage cells in each row of the array repositions the already stored sample levels, for example, by moving each to an adjacent cell, so that the 'pattern' defined by the stored signal levels changes for each timing interval.

When a next set of M sample levels is added to the array under control of the timing means, defining a new configuration of level states in the storage cells, this defines the start of a timing interval of which the first of the succession of clock pulses is applied to the address means 33 of the array reading means 30. The address means 33 locates the first template word $W_1$ in the template storage means which is extracted on bus 25. the reading means responds to each of the m (=M) address words forming the template word, directing one to each row of the storage cell array and, in accordance with the address word values addressing the appropriate storage cell on that row and reading the binary logic state of the cell.

The binary states of the M addressed cells, as determined by the array reading means are applied to the decision means 31. The decision means determines what proportion of the set of read cells have binary '1' states and if there are enough this is treated as the existance of a distribution of '1' in the storage cell array identical to the pattern feature map and thus detection of the pattern feature in the input signal. A sufficient level of identity may be achieved by a simple determination that all, or all but one, addressed storage cells have a '1' level, or any more complex arrangement such as counting the number of '1''s to determine an acceptable proportion of the total number (M) of addressed cells.

If the decision means shows that the pattern feature represented by the template word has not been detected then there is no detection signal at 32 (or on line 34) and the address means 33 responds to the next clock pulse from the timing means to locate and cause extraction of the next template word $W_2$, which in accordance with the values of the cell address words thereof enables the array reading means to read the binary states of the storage cells addressed by it and supply the read states to the decision means again. If again there is no detection of the presence of the pattern feature represented by the template word then the cell addressing/reading/decision procedure is repeated by the next and each successive clock pulse until the last clock pulse, last template word or end of the timing interval whichever is the limiting factor.

In the next timing interval, when a new detection distribution of signals in the storage cell has been effected with addition of the newest samples, the succession of clock pulses controls the extraction of the same sequence of template words.

If in any timing interval the decision means shows that a pattern feature has been detected in the signal as configured in the storage cell array then a detection signal is produced at output 32, which signal may be used simply to alert of such detection or applied to additional apparatus to perform other functions. The detection signal is also applied by line 34 to address means 33 so as to interrupt the sequence of template word extraction and, if desired, to cause an indication of the identity of the template word, for example its number in the sequence, to be provided at output 35.

It will be appreciated that the above described operation represents a basic procedure which may be modified with or without corresponding modifications to the structure of the apparatus.

For simplicity of description it has been assumed that a pattern feature map can be defined as in FIG. 1(d) with a single '1' on each row of the array corresponding to the full pattern of FIGS. 1(c) or 1(b) so that the location of the '1' can form the address word. It will be appreciated that the signal pattern may not extend to every row of the array, for instance the portion 10' of the object in FIG. 1(a) may be missing so that the binary level signal on the bottom row of the array (shown dotted) is absent, as is the corresponding '1' on the bottom row of the bit map pattern of FIG. 1(c). If the pattern feature map of FIG. 1(d) has no '1' location then a 3-bit binary word cannot be defined for that row.

To cater for such an eventuality the cell array may be organised such that the contents of its cells i.e. their states, is as shown in FIG. 1(f). The signal, represented by binary states of the samples, is shifted in the timing intervals from right to left from cells 1 to N(=8) but the final cells in each of the rows (channels) are constrained to assume a permanent '1' state and the pattern is effectively restricted to an $M \times (N-1)$ array. After several samples of the modified signal of FIG. 1(b) have been input the cell contents are as shown in the FIG. 1(f).

The pattern feature defined for the bit map pattern of FIG. 1(c), as modified by the absence of any '1' on the bottom row, is as shown in FIG. 1(g), the pattern feature map effectively confined to cell addresses 0 to (N−2) and the address (N−1) comprising a flag which is a '0' if a '1' appears in the pattern feature of that row and a '1' if the row is empty, as is the bottom row.

It will be seen that an address word can now be defined for every row and the table of FIG. 1(h) shows the address words comprising the corresponding template word.

For the above description it was assumed that the number of storage cells in the array is identical with the number of elements of a pattern from which a pattern feature, in the form of a template word, can be derived, that is, the array has M rows and each template word comprises M address words and each row has N storage cells and each address word defines a cell number between 1 and N.

It will be appreciated that the pattern feature may be restricted to an $m \times n$ sub-array of the $M \times N$ cell array, where either or both $m < M$ and $n < N$.

If there is sufficient capacity for a large number of template words, those words may still comprise M address words each able to select one of N addresses, but the information content of the words restricted only to designate cells in a particular $m \times n$ sub-array, different template words having their contents arrayed to specify a different sub-array of storage cells, even though the pattern feature relative to the sub-arrays may be identical.

It is more beneficial to limit the number of template words so that a particular pattern feature is defined by a template word irrespective of the location of the $m \times n$ sub-array of cells.

The array reading means 30 can then be provided with multiplexing means 36 which responds to a signal from the timing means to associate a template word of m address words, which defines only a pattern feature per se with the correct m adjacent rows of the array. The multiplexing means may simply index the rows addressed for each template word or group of successively extracted template words, that is, address rows 1 to m, then 2 to m+1, ... M-m+1 to M.

The template word may contain an extra multiplexer address word for directing the multiplexer as to which m rows are to be addressed limiting definition of a sub-array to a particular part of the array, that is, controlling the limits of said indexing means.

In the other co-ordinate direction the definition of the sub-array may likewise be achieved by simply grouping cell address values within a particular range of values according to allowable ranges of values of the cell address words or by the multiplexing means creating an offset in the values of all address words received from the template storage means to displace the allowable address in the N direction in accordance with repositioning the sub-array with respect to the storage cell array 21.

It will be appreciated that the multiplexing means may be associated with the address means 33 such that certain template words are extracted only in relation to certain positions of the $m \times n$ sub-array.

The template storage means stores a large number of template words which may be loaded into the store in any desired order and which are read out in sequence by the addressing means. It will be appreciated that any particular relationship may be established between storage locations and the addressing of locations to extract a sequence of template words. Similarly not all template words need relate to a single pattern feature but a plurality of pattern features may be searched for. Where all of the template words required for a plurality of pattern features can be extracted within a timing interval then it is not necessary to organise the storage or extraction of template words in any way as they will all be extracted during the timing interval.

Where the number of pattern features or duration of any timing interval do not permit this the template words may be organised into a series of hierarchical groups each template word of a higher order group being associated with all the words of a different lower order group. Where a feature represented by a higher order template word is characteristic of a particular pattern or source or of a class of patterns then the lower order template words may represent additional characteristic pattern features thereof which are called up for detection as described above as verification of detection of the pattern or source.

This hierarchical procedure of categorising pattern features may also be employed, not only in verifying a source but as part of its initial identification within a class of patterns showing the generic higher order feature.

As an example, the higher order pattern feature may represent an object pattern as scanned in a particular direction, and the lower order pattern features associated therewith may be limited to features associated with such a scan direction, thereby limiting the number of potentially matching templates which have to be compared.

As another example, where the pattern feature is produced by scanning over an object, the pattern features represented by the higher order template words may determine whether the object is a regular, or sharp-angled, man-made object or whether it is a more irregular 'natural' object, and subsequent to detection of, say, a man-made object, the lower order template words pattern could be employed to determine the nature of the object, say, that the object is a vehicle or even the type of vehicle. As illustrated in FIG. 2, the template words $W_1$-$W_4$ comprise the higher order group H template words $W_5$-$W_7$ comprise a first lower order group $L_1$ associated with $W_1$, template words $W_8$-$W_{10}$ comprise a second lower order group $L_2$ associated with $W_2$, template words $W_{11}$-$W_{13}$ comprise a third lower order group $L_3$ associated with $W_3$ and template words $W_{14}$ to $W_{16}$ comprise a fourth lower order group $L_4$ associated with $W_4$.

It will be appreciated that although there are only two hierarchies considered here, H and L, each of the template words of the lower order groups could each be associated with yet a lower order group of template words. The template storage means is preferably, but not necessarily, organised to store the template words of each group in successive locations and the array reading means 30 is organised such that the addressing means 33 indexes through, and extracts, only template words $W_1$-$W_4$ in response to the clock pulses and failure to detect a pattern feature for an extracted template word. If, however, a detection signal is produced then the addressing means 33 responds to the signal on line 34 to extract subsequent template words from the lower order group $L_1$-$L_4$ associated with the template and causing the detection signal.

It will be appreciated that, in general, if the higher order group contains h template words, so that there are h lower order groups, each containing j template words then a pattern feature may in general be detected by extraction of no more than (h+j) template words instead of the hx(j+1) template words actually stored.

The number of template words which can be extracted for determination in any timing interval is a function of the duration of the timing interval and of the operation time required to extract a template word/read the addressed storage cells/make a decision of detection.

The operation time is clearly dependent upon the construction of the functional elements employed, such as whether all the signal channels can be dealt with in parallel. The duration of the timing interval may be fixed by the rate at which signals are input for sampling, for instance, if produced by a mechanical scanning apparatus, in which case the maximum number of template words is fixed, or alternatively if the duration of the timing interval is not fixed by external factors it may be chosen to permit extraction of a predetermined number of template words.

There may be situations wherein the timing intervals vary in duration in operation, for example, if the sampling of the signal is by externally controlled apparatus or, if the signal is represented by discrete samples, the presentation of such samples designating the timing intervals rather than vice versa. To maximise the number of template words which may be extracted in such ill-defined timing intervals the template storage means may be given an order of priority of extraction, either by the choice of locations in which the template words are loaded or the sequence in which they are addressed by the address means. The storage means may be loaded to contain enough template words for their extraction and subsequent operations to fill the longest possible timing interval, extraction of the lower priority template words simply being omitted if the timing interval ends earlier, or, or course, if a detection signal is produced.

Such a priority order of template words may apply also to the template words organised in hierarchical groups.

The array of storage cells is shown as a rectangular array defined by cartesian coordinates and wherein the rows of the array correspond to individual channels of an applied signal. It will be appreciated that such a rectangular array may be defined differently with the signal channels being associated with columns thereof rather than rows or the array based on a different coordinate system, such as polar coordinates.

As stated one of the factors governing the choice of timing intervals and thus the number of template words which can reasonably be used is the time taken by the array reading means and decision means to operate. FIG. 3 is a schematic representation of a preferred form of apparatus according to the invention and consisting of elements which correspond to the functional generalised blocks of FIG. 2.

The two dimensional array 21 of storage cells is provided by a set of M (=8) one-dimensional serial input shift register 40 associated, as shown, with the rows of the array. Each shift register 40 has N (=8) stages 41 corresponding to the storage cells of each row and each shift register has parallel outputs 42 one for each stage.

Input means 26 includes signal pre-processing and sampling means 28, which responds to signals received on input channels to produce M (=8) binary channel signals, one for each shift register, and timing means 29 which controls the production of the channel signals, their application to serial inputs 27 of respective registers and shifting of the register contents from stage to stage in synchronism with the binary channel signal input.

The pre-processing part 28 of input means 26 may be considered optional in that if a two dimensional binary signal is provided it may be considered as comprising a succession of samples and be applied directly to the shift register inputs.

However, if the signal is provided in analog form, say from a linear array of sensors, the input means is required to pre-process the signal into binary form.

The pre-processing means comprises, for each channel, filter means 43 (optional) for limiting the frequency band of the analog signals, sample means 44 responsive to timing signals from the timing means to take sample signal levels of the (filtered) analog signal and thresholding means 45 to which the sample is applied.

The thresholding means 45 comprises a first Schmitt trigger 46 and in parallel therewith an inverter 47 and second Schmitt trigger 48, the outputs of the Schmitt triggers being coupled by way of an OR gate 49 to the shift register serial input 27. The thresholding means functions in respect of both positive-and negative-going level variations in the sample signal with respect to a 'background' level effectively changing output state irrespective of whether the analog input signal is produced, for example, by a sensor as in FIG. 1, in response to an increase or decrease in received radiation caused by object scanning.

The template storage means 23 comprises a read only memory (ROM) 23' which may be of the programmable or re-programmable type, in which each template word is stored as an M.$\log_2$N-bit word, that is, an 8×3=24-bit word, comprising the set of eight 3-bit storage cell address words (derived in accordance with the aforementioned relationship between the table of FIG. 1(e) and pattern feature of FIG. 1(d)) each capable of assuming a decimal value between 0 and 7 and representing one of the eight shift register stages in one of the shift registers.

Because the cell address words are stored as a single 24-bit template word the words are extracted in parallel on a 24-bit wide template output bus 25.

Depending on the internal structure of the ROM employed the template word is stored in successive addresses of the ROM and the addressing means 33 of the array reading means 30 comprises a ROM address register 33' operable to point to the start address of each template word in response to clock pulses received in succession from timing means 29 on line 50. The ROM 23' and ROM address register 33' respond to each clock pulse to index the address pointer to the next template word start address and extract the 24-bit template word non-destructively by reading and presenting it to the template bus 25. The ROM address means 33' may have a second input line 34' connected to decision means 31 by which a detection signal causes the address pointer to designate a different ROM address than in the index sequence. This enables the template words to be arranged in hierarchical groups as described above, detection of a pattern feature in response to an extracted template word causing subsequent extraction of template words from a different part of the ROM.

The array reading means 30 comprises gating means associated with each register stage and arranged to be opened by an applied signal, corresponding to a storage cell address word extracted from the ROM, to pass a signal of a level appropriate to the binary state of the stage addressed. The gating means associated with each shift register 40 comprises a 1-out-of-N data selector 51 having N (=8) data inputs 52, connected one each to individual stages of the register to the parallel outputs 42 thereof, $\log_2$N (=3) binary address inputs 53 connected to respective individual members of the ROM output bus 25, that is, one 3-bit wide section corresponding to one cell address word, and a single output line 54, connected to the decision means 31. The data selector 51 responds to the appearance of a 3-bit address word in appropriate part of the template bus to connect the selected data input terminal to the output line, thereby applying the binary logic state of the appropriate register state to the decision means.

As all of the data selectors work independently and in parallel upon extraction of the template word, the M register stage states are also applied to the decision means in parallel.

The decision means 31 comprises an AND-gate 55 having M inputs connected one each to the outputs 54 of the data selectors 51 and an output 56 connected to the output terminal 32. It will be seen that the AND-gate 55 responds to the existance of a '1' state in each of the register stages addressed by a template word to provide an output which comprises a detection signal.

It will be appreciated that although the signal as sampled and stored comprises distinct binary levels the accuracy of sampling may be affected by noise on an analog input signal, such noise being manifested as additional or missing bits in the two dimensional binary signal stored in the shift register array.

The presence of extra 'noise' bits is not in practice a serious drawback in that provided the distribution of pattern feature bits exists such pattern feature will be detected and the random distribution of additional noise bits is unlikely to match the pattern and lead to false detection.

Missing bits on the other hand lead to a situation where a pattern feature cannot be detected through failure to satisfy the input conditions of the AND gate 55.

To permit operation where a pattern detection is complete but for a difference of one such bit, the decision means 31 may also comprise an M-input exclusive-OR gate 57, the inputs of which are connected to receive logic state signals from the selector outputs 54 by way of logic state signals 58. The gate 57 has an output 59 which combines with the output of AND gate 55 in OR gate 60 to provide the output signal to the output terminal 32. The gate 57 operates by producing a significant output state if any one of the selector outputs is '0', that is, if the currently applied template detects a pattern feature in all but one. Clearly, if desired, other gating configurations may be included in the decision means whereby the presence of any number, or proportion, of selector outputs is deceived to define adequate pattern feature detection. Furthermore the gating arrangements may be replaced by other means of determining the presence of substantially M selector outputs, for example a summing circuit and store could count the number of selector outputs for each template word and compare the count total with a reference count.

It will be appreciated that other modifications are possible using alternative implementations of the functional components described above.

For example, the data selectors 51 respond to 3-bit storage cell address words from the ROM to select the appropriate register stage. The ROM could be arranged with a template word bus providing M×N individual outputs each selecting one of the shift register stage outputs 42 by way of addressing (opening) a simple OR gate associated with the stage output, the outputs of all the N gates associated with a shift register being combined in a further OR gate (not shown) to provide a single output corresponding to that 54.

The decision means output is connected by line 34' to the ROM address register 33' and is employed, as described above, when the template words are organised into hierarchical groups. The address register points to a lower hierarchical group of template words when a detection signal is produced from a higher order group. The decision means may include a triggered bistable device or simple two (or more) - stage shift register 61 before the output terminal 32 to which the detection signal is applied whereby a 'detection' signal is given as an output only after the two (or more) detections required by the hierarchy of template words or any verification sequence.

It will be appreciated that the construction adopted for the embodiment described with reference to FIG. 3 requires a minimum of time for extracting each template word and in response thereto reading the corresponding storage cell states and making a decision on pattern feature detection, the reading/decision being performed in parallel for all signal channels.

Clearly the number of channels required (M) is open to variation in accordance with the number of signal channels required, changes in the value of M requiring more storage cells and a ROM capable of holding larger template words but not altering the operating cycle time.

Similarly the value of N could be changed but to less benefit unless a pattern feature extends in that coordinate direction greater than the number N of storage cells envisaged.

Such a construction is particularly suited to the examination of electrical signals produced by an imaging array of detectors, as illustrated in FIG. 1(a) caused to move at high speed and produce by scanning an image input signal for real-time input to the shift registers of the storage means.

One example of such an imaging array is in detection means carried by a projectile and arranged to look down at terrain overflown by the projectile. The sensors may operate in the visible, near infra-red or far infra-red parts of the spectrum to derive said signals on channels corresponding to the sensors of the array. The speed at which the terrain, and any object thereon defining a pattern, passes through the field of view of the imaging array is a function of the projectile velocity and altitude. Projectiles have been proposed which fly relatively low and attempt to detect a pattern feature of any potential targets overflown, in response thereto firing a directional warhead at a target so detected.

It will be appreciated that for efficiency of target destruction such projectiles must travel at relatively low altitudes thereby receiving input signals, representing terrain images and patterns of any objects, including targets, at high speed. Furthermore, the signals must be processed in real-time with the introduction of no more than a small line delay to enable the projectile to detonate effectively whilst still over a detected target.

The speed at which the simple pattern features defined by the template words are compared with the 'pattern' of the input signal by addressing different component parts thereof in rapid succession by way of altering the template words enables a large number of template words to be extracted in a timing interval which is necessarily short due to the way in which the input signal is formed and if a pattern feature is detected by one of the extracted template words this detection is indicated within the current timing interval. Thus in accordance with the present invention the ability to process large numbers of simple pattern features at high speed with simple processing techniques renders it suitable to high-speed real time operation, albeit at the expense of compiling and loading many, possibly thousands of template words corresponding to permissible pattern features to be detected.

Although the configuration shown in FIG. 3 is particularly suited to making a large number of comparisons in short timing intervals it is not limited to the specialised use above.

An array of sensors as shown in FIG. 1(a) may for example be employed in a hand-held device suitable for scanning alphanumeric characters and the pattern features, defined by the template words, may relate to characters in a variety of fonts or even handwriting styles and consistent with being scanned at different orientations. The substantially real-time recognition of characters by the pattern features chosen therefor enables the recognition of words, which words may be used in other equipment or presented to the operator as scanned. For example, the words may be presented audibly by speech synthesiser, enabling blind persons to read conventional documents without severe constraints being placed upon the relative orientation or speed between the scanning array and document.

The apparatus of the present invention, by dealing with the values of one coordinate direction of the two dimensional signal in parallel is particularly suited to such two-dimensional signals presented on discrete input channels. It will be appreciated that such signals may be derived from a serial source although their effect is one of two dimensions. For instance one field of a television signal, although a serial CRT modulation signal, is manifested as a two dimensional raster of brightness variations. The image presented by all or part of a CRT may comprise a signal having a pattern suitable for detection by the present invention.

The video signal, or that part of it relating to a pattern of interest may be presented to the input means and directed onto appropriate input channels in accordance with the raster formation of the display and a pattern feature detected therein as described above by repeated extraction of suitable template words defining possible pattern features. It will be appreciated that division of the serial video signal onto separate input channels may involve the provision of extra temporary storage or delay means. Instead the shift registers 40 may be connected in series with each other and the serial video signal stepped therethrough to provide line to line delays until all of the future lines have been received.

The apparatus is operable with any two-dimensional signal which can be defined or input on the separate channels and is not restricted to time varient signals.

A two dimensional signal is for instance, produced by a spectrum analyser, in which an analysed time-domain signal is presented as a signal in which amplitude or power varies as a function of frequency, as illustrated in FIG. 4(a) with conventionally oriented axes. The same relationship may be illustrated as in FIG. 4(b) with the frequency axis as the ordinate and the amplitude axis as the abscissa. It will be seen that at each frequency interval the signal amplitude, that is, its peak value takes a single value and this may be compared with FIG. 1(c) in which a pattern feature for a template word is defined comprising one storage cell address per input channel. Thus by applying such a signal to the apparatus with each frequency interval step assigned to an input channel and samples taken of the signal at timing intervals which represent the amplitude steps the two-dimensional signal may be shifted through the storage cell array and compared with templates of known frequency responses, as defined by template words extracted from a template store.

Such an arrangement requires one input/storage cell channel/cell address word for each frequency interval step and in order to enable complete detection for a wide-band signal spectrum may demand unacceptable amounts of hardware.

There may be situations where only a portion of the spectrum is of interest, detection of a particular response in this portion being indicative of a source. Furthermore, because of the relatively low number of the possible pattern features of an analyser signal (compared with the orientation etc. variations from a scanned image signal) the time available for signal processing may be utilised more effectively to reduce the hardware content of the apparatus.

FIG. 4(c) shows a similar frequency domain signal to FIG. 4(a) but with a plurality of pattern features A, B, C etc which collectively define the signal, superimposed thereon. The signal may then be input to the apparatus with the amplitude steps applied to the individual input channels and samples at the frequency interval step being taken in accordance with the timing intervals governing shifting of the signals through the storage cell array. The signal is preferably pre-processed so that only the limiting amplitude values (shown) are used.

As the signal samples are input to, and shifted through, the storage cell array a first section the signal results in detection of the pattern feature A with an extracted template word, a further section thereof results in detection of the pattern feature B with a different template word and so on, the combination of template word pattern features that is A+B+... resulting in detection of the complete signal. Such an arrangement may be performed by organising the template words associated with the pattern features into hierarchical groups as outlined above. Naturally a pattern feature restricted to a small part of the spectrum may be detected in isolation rather than in combination.

As described throughout the specification the signal samples are referred to a threshold level and stored in binary form conveniently represented by the logic state of a shift register stage or other form of storage cell. It will be appreciated that a suitable form of storage cell may be provided able to hold more complex information, namely a value for the sample level, in either analogue or digital form. The reading of the level by the array reading means becomes a little more complex in providing said levels to other decision means which may contain thresholding means or otherwise combine the read levels to determine the correspondence with the levels which would indicate detection of a pattern feature.

We claim:

1. A method of detecting a pattern feature in a two-dimensional electrical signal applied to a coordinate array of storage cells comprising, in a preliminary step, storing a plurality of template words, each template word being a plurality of storage cell address words, individual ones of which are associated with the individual values of one coordinate direction of the array and represent address values in the other coordinate direction, of cell locations coincident with a template, defining the pattern feature, mapped onto the array, and operationally applying a two-dimensional signal to said array of storage cells, extracting a stored template word addressing simultaneously a set of cells, one at each value of said one coordinate direction, at address values of said other coordinate direction defined by the template word, reading the signal levels of the addressed cells, determining whether substantially all of the levels of the addressed cells are characteristic of the levels of a pattern feature template, and in response to a successful determination, providing an indication that the pattern feature has been detected in the two dimensional electrical signal.

2. A method as claimed in claim 1 comprising defining a succession of timing intervals in each of which a sample of the electrical signal is taken, and in each timing interval applying the sample signal to the storage cell array, thereby altering the distribution of signal samples amongst the storage cells, extracting one or more of the stored template words and addressing storage cell sets defined thereby.

3. A method as claimed in claim 2 tolerant of variation in the duration of the timing interval in operation, said method comprising including at least as many template words as can be extracted within the maximum duration of timing interval, and extracting the template words in a predetermined order of priority until either the end of the timing interval or successful detection of a pattern feature.

4. Apparatus for detecting the presence of a two dimensional pattern feature in a two dimensional electrical signal, comprising a plurality of signal storage cells interconnected to define a coordinate array of M rows each of N cells corresponding to a two dimensional pattern field, input means arranged to apply temporally and spatially distributed electrical signals in discrete level samples to the array of storage cells to define a stored input pattern signal, template storage means operable to store a plurality of template words, each word comprising M address words associated individually with m adjacent rows of the storage array cells, where $1 < m \leq M$ and each identifying the address of one only out of N adjacent cells, where $1 < n \leq N$, of its associated row, said template word defining a two dimensional linear template pattern mapped onto the storage cell array and extending across said M rows of cells but of one cell width only in each row, array reading means operable to extract one template word at a time from the template storage means and, for each template word extracted, cause the address words thereof simultaneously to address the storage cells of the m lines defined thereby and read the sample levels of the input signals in the addressed cells, and decision means responsive to sample levels characteristic of a pattern feature output from substantially all of the simultaneously addressed storage cells to provide a detection signal indicative of the presence in the two dimensional electrical signal of the template pattern represented by the extracted template word.

5. Apparatus as claimed in claim 4 in which the input means includes timing means operable to define a succession of timing intervals, in each of which a one-dimensional signal sample is applied to the storage cell array, and operable to produce a succession of clock pulses in each timing interval, said reading means being responsive to each of said clock pulses to extract a template word from the template storage means and read the storage cells addressed by the extracted template word.

6. Apparatus as claimed in claim 5 in which the duration of the timing interval is a function of the input signal, said template words or any group thereof comprising at least as many as can be extracted in a timing interval of maximum duration, and the template storage means and/or array reading means being arranged such that the template words are extracted in a predetermined order of priority until the end of a timing interval or production of a detection signal.

7. Apparatus as claimed in claim 4 in which the template storage means is arranged to store one or more template words having a value of $m<M$ and/or $n<N$, said array reading means including multiplexing means operable to define a plurality of $m \times n$ cell sub-arrays of storage cells by control of address inputs thereto, causing extracted template words to address appropriate storage cells of a defined sub-array and in response to lack of detection of a pattern feature for a template word define a new sub-array of different adjacent storage cells and cause them to be addressed in accordance with the extracted template word.

8. Apparatus as claimed in claim 4 in which the two-dimensional array of storage cells comprises a set of M one-dimensional serial-input shift registers, associated with individual values of one coordinate direction of the array and each having N stages corresponding to the cell address values of the other coordinate direction of the array, the input means being operable to produce from the electrical signal in each timing interval, M channel signal samples, one for each shift register, defining for each sample a binary level or state dependent upon the levels of the sample with respect to a threshold, and to apply said binary sample signals to the serial inputs of the corresponding channel shift registers.

9. Apparatus as claimed in claim 8 in which the template storage means comprises a read only memory having storage addresses therein each template word being stored therein as an $M.\log_2 N$-bit word and defining a set of M cell address words, each representing a shift register stage corresponding to one of N array cell locations in said other coordinate direction.

10. Apparatus as claimed in claim 9 in which the read only memory has an output bus on which all of the bits of the template word are represented simultaneously upon extraction.

11. Apparatus as claimed in claim 10 in which each of the M shift registers has parallel outputs, one for each of its N stages, providing signals indicative, by their binary levels, of the occupancy of register stages, and in which the array reading means includes gating means associated with each register stage arranged to be opened by an applied signal, corresponding to a cell address word extracted from the template storage means, to pass a signal of appropriate level to the state of said stage, effectively reading the state of the stage.

12. Apparatus as claimed in claim 11 in which the gating means associated with each shift register comprises a 1-out-of-N data selector having N data inputs, connected one each to individual stages of the register, $\log_2 N$ address inputs connected to individual members of the read only memory output bus and a single output connected to the decision means.

13. Apparatus as claimed in claim 11 in which the decision means comprises an AND gate having M inputs connected one each to the gating means of one shift register, said gate being responsive to a suitable binary state from each of the shift register stages addressed by a template word to provide a detection signal.

14. Apparatus as claimed in claim 13 in which the decision means further comprises an exclsuive-OR gate having M inputs connected one each, by way of an inverter, to said gating means of the array reading means whereby said gate is responsive to the presence of a suitable binary state read from all but one of the shift register stages addressed by said template word to provide a detection signal.

* * * * *